United States Patent [19]

Siegel

[11] Patent Number: 4,479,164

[45] Date of Patent: Oct. 23, 1984

[54] CONTROL FOR AN ELECTROSTATIC TREATER

[75] Inventor: Leon S. Siegel, Sand Springs, Okla.

[73] Assignee: Combustion Engineering, Inc., Windsor, Conn.

[21] Appl. No.: 443,076

[22] Filed: Aug. 9, 1982

[51] Int. Cl.³ .............................................. B03C 9/00
[52] U.S. Cl. .................................... 361/235; 210/695; 323/903
[58] Field of Search ................. 361/226, 235; 210/689, 210/695, 748, 739, 746, DIG. 6; 55/103, 105, 139; 323/237, 903, 265, 282

[56] References Cited

U.S. PATENT DOCUMENTS

| | | | |
|---|---|---|---|
| 4,018,683 | 4/1977 | Walters et al. | 210/739 |
| 4,130,483 | 12/1978 | Woltrip | 210/748 X |
| 4,152,124 | 5/1979 | Davis | 55/105 |
| 4,316,805 | 2/1982 | Faust et al. | 210/748 X |
| 4,354,152 | 10/1982 | Herklotz et al. | 55/105 X |

Primary Examiner—Harry E. Moose, Jr.
Attorney, Agent, or Firm—David L. Smith

[57] ABSTRACT

An automatic voltage control system controls the voltage delivered to the primary winding (12) of a step-up transformer (10) and hence the power delivered to a dehydrator (40) so as to prevent the step-up transformer (10) from exceeding rated power when a current limit occurs. The automatic voltage control system controls the voltage applied to the primary winding (12) so as to maximize the voltage applied to the grid elements (38) of the dehydrator (40). Upon encountering a current limiting condition, the automatic voltage control system reduces to zero the voltage applied to the primary winding (12) and hence the power applied to grid elements (38) of the dehydrator (40) to dissipate the cause of the current limiting condition. The voltage is reapplied to primary winding 12 at a voltage level below where the current limit occurred. The voltage is then increased to maximize the voltage applied to the grid elements (38) of the dehydrator (40). Upon encountering a voltage limit, the voltage is maintained at a constant level until either an arc or current limit are encountered whereupon the control cycle is repeated.

13 Claims, 5 Drawing Figures

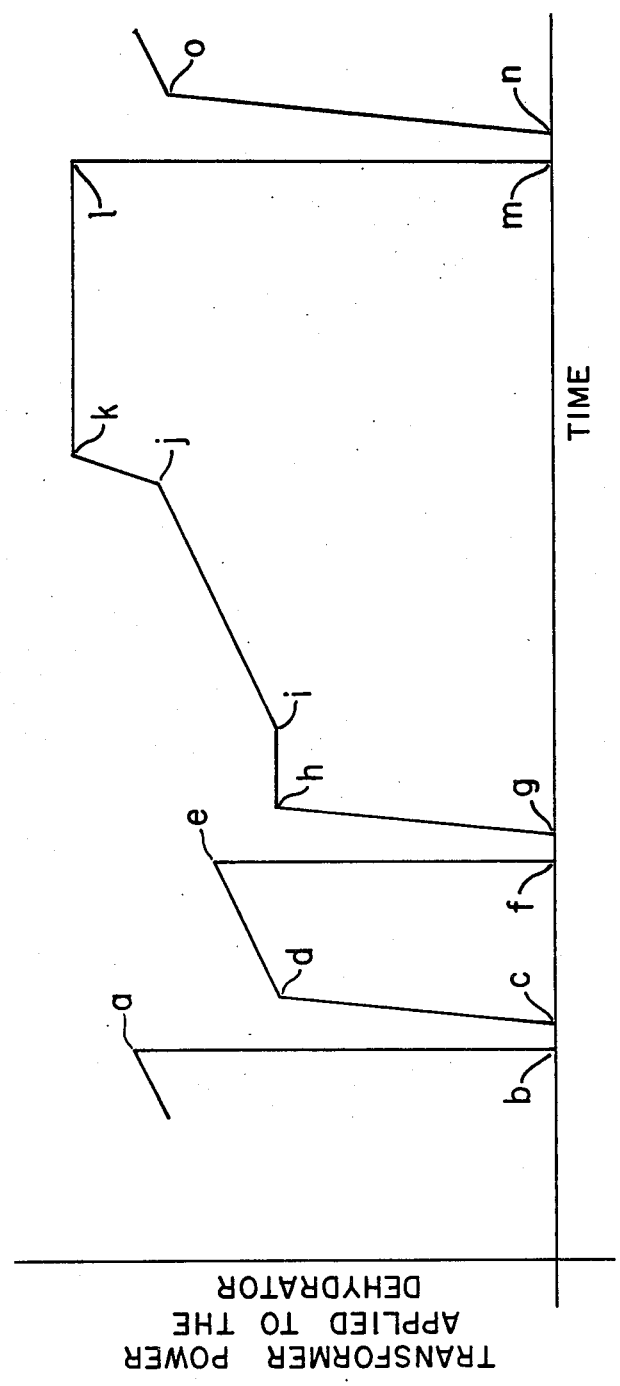

CONTROL FOR AN ELECTROSTATIC TREATER

BACKGROUND OF THE INVENTION

This invention relates to removing water from an emulsion of oil and water and in particular to a voltage control system for controlling the voltage applied to the primary winding of a step-up transformer to limit the power available to the primary winding of the step-up transformer and hence the power available to the dehydration process so as not to exceed rated power of the step-up transformer.

A reactive impedance has been used in separation processes to protect transformers from exceeding rated power. The reactive impedance was placed in series with the primary winding of the transformer being protected and was designed to be a 100% reactive impedance, that is, with a short circuit on the secondary winding of the transformer, the current passing through the primary winding and reactive impedance was limited to rate current. Although this method of protecting a transformer was very effective, during normal operation the series reactive impedance limited the power delivered to the load on the secondary winding to the transformer to about one-half of the rated power of the transformer. Therefore, an oversized transformer was necessarily required for all applications utilizing a series, 100% reactive impedance as a means of protecting the transformer. Oversizing a transformer by a factor of 2 results in the capability to deliver the desired power to the separation process when a 100% reactive impedance is used to protect the transformer but makes the original equipment investment very expensive. The investment is even greater when the transformer is a high voltage, power transformer like those used in electrostatic precipitator and oil dehydrator applications.

An alternate method of protecting the transformer from exceeding rated power is to reduce or eliminate the series reactive impedance and place a voltage control circuit in series with the primary winding of the transformer. Usually a smaller reactive impedance remains in the circuit to filter current surges. Voltage control has been used in electrostatic precipitator separation processes. In adapting a voltage controller from an electrostatic precipitator separation process to an oil dehydration separation process, a problem was encountered that severely limited the effectiveness of the dehydration process. To understand the problem it is beneficial to first review the electrostatic precipitator separation process control application.

In the electrostatic precipitator application, a voltage controller was successful in controlling the power delivered to the primary winding of a step-up transformer so that the transformer rated power was not exceeded when conditions in the electrostatic precipitator were such that the electric field intensity exceeded the voltage at which the dielectric broke down and arcing occurred. A dielectric breakdown was detected by an undervoltage limit. The control system was developed to break the arc by detecting the arcing condition, reducing the voltage applied to the primary winding of the step-up transformer to zero for at least one-half cycle, then reapplying the voltage to the primary winding of the step-up transformer at a voltage level below the voltage level at which the arcing occurred.

When the air between grid elements ionized such that a conductive path was formed therebetween, the automatic voltage control system would go into a current limit condition. The conductive path of ionized air was essentially a short circuit across the secondary winding of the step-up transformer; the current limit protected the step-up transformer from exceeding rated power. During the current limit conditions, the separation process ceased, although throughflow and power consumption continued. No control action was taken to eliminate the cause of the current limit and thereby eliminate unnecssary power consumption as well as increase the ineffectiveness of the separation process.

Similar conditions arose in the electrostatic dehydrator when adapting a voltage controller from an electrostatic precipitator application. A dielectric breakdown occurred when the electric field intensity exceeded the voltage at which the dielectric broke down and arcing occurred. A dielectric breakdown was detected by an undervoltage limit. The automatic voltage control system responded as it responded to a dielectric breakdown in the electrostatic precipitator application.

When a conductive path of water formed between opposite polarity grid elements causing a low resistance path therebetween, the automatic voltage control system would go into a current limit condition. The low resistance path was essentially a short circuit across the secondary winding of the step-up transformer causing the dehydration process to cease although throughflow and power consumption continued. The low resistance path problem is different from the dielectric breakdown problem in that the dielectric breakdown will result in the automatic voltage control system limiting power by a voltage limit while a conductive path between opposite polarity grid elements result in the automatic voltage control system limiting power by a current limit.

There is a need for a means of protecting the step-up transformer in an electrostatic separation process from exceeding rated power during the occurrence of a low resistance path between opposite polarity grid elements that permits sizing the step-up transformer more consistently with the load requirements and upon the detection of a low resistance path between opposite polarity grid elements creating conditions favorable for breaking the low resistance path.

SUMMARY OF THE INVENTION

The automatic voltage control system of the present invention fulfills the need of a method and apparatus to protect the step-up transformer from exceeding rated power during the occurrence of a low resistance path between opposite polarity grid elements without necessitating oversizing by such a large factor. Upon detection of a low resistance path between opposite polarity grid elements, the protective circuit goes into a current limit condition, reduces the voltage applied to the primary winding of the step-up transformer to zero for at least one-half cycle, then reapplies the voltage to the primary winding of the step-up transformer at a voltage level below the voltage level at which the low resistance path occurred. During the zero voltage condition, the throughflow breaks the low resistance path so that when voltage is reapplied to the transformer, the low resistance path has been eliminated and the dehydration process can continue. Upon a current limit condition, power consumption that does not promote the dehydration process is eliminated.

BRIEF DESCRIPTION OF THE DRAWING

FIG. 3 shows the power applied to the separation process under various operating conditions.

DESCRIPTION OF THE PREFERRED EMBODIMENT

Figure 1:
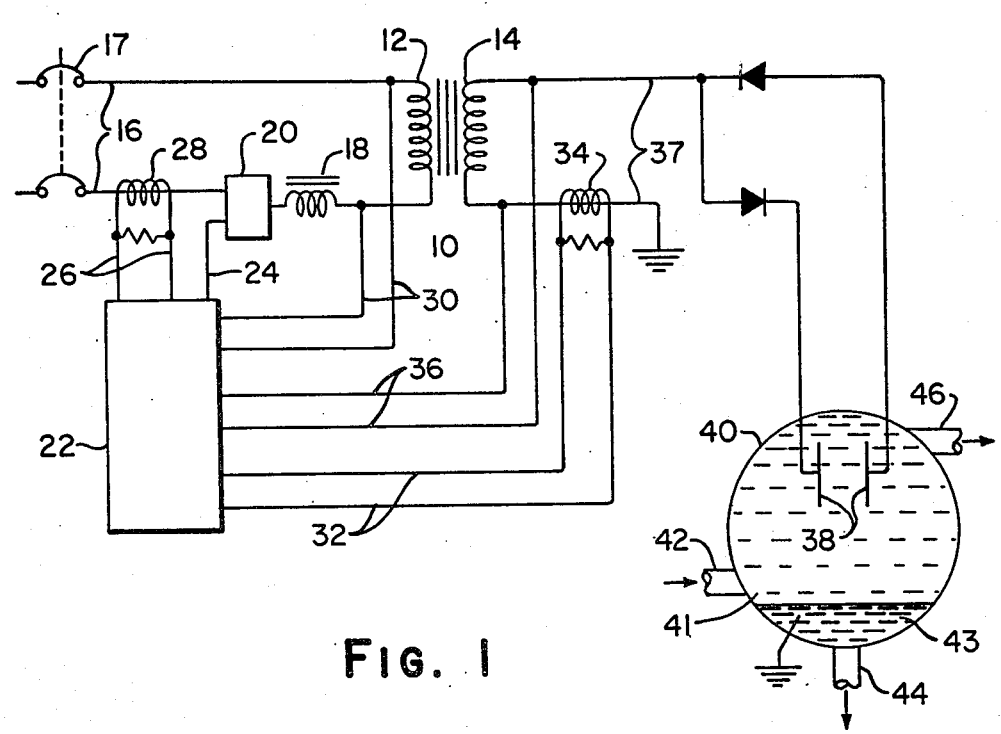
FIG. 1 is a schematic diagram of the voltage control system and separation process embodying the present invention.

Referring to the drawing, there is depicted therein an automatic voltage control system designed in accordance with the present invention as best seen schematically in FIG. 1. Step-up transformer 10 is comprised of primary winding 12 and secondary winding 14. Primary winding 12 is connected across an alternating current voltage source by leads 16. In series with primary winding 12 is reactive impedance 18 which upon a short circuit across secondary winding 14 limits the current passing through primary winding 12 but since reactive impedance 18 is less than a 100% reactive impedance, reactive impedance 18 does not limit the current passing through primary winding 12 to less than rated current. Solid state switch 20 also in series with primary winding 12 controls the voltage applied to primary winding 12. Solid state switch 20 is turned on by voltage control and gate firing circuit 22 through conductor 24. Voltage control and gate firing circuit 22 senses primary winding 12 current through leads 26 and current transformer 28 in addition to primary winding 12 voltage through leads 30. Voltage control and gate firing circuit 22 senses secondary current through leads 32 and current transformer 34 in addition to secondary winding 14 voltage through leads 36.

Secondary winding 14 is connected by leads 37 to grid elements 38 of oil dehydrator 40 wherein the dehydration process occurs. The voltage applied to grid elements 38 can be an alternating current voltage, a direct current voltage or, as shown in FIG. 1, a combination of alternating current and direct current voltage. The oil-water emulsion enters dehydrator 40 at port 42. The water removed in the dehydration process is discharged from dehydrator 40 at port 44 and the dehydrated oil exits from dehydrator 40 at port 46.

Figure 1A:
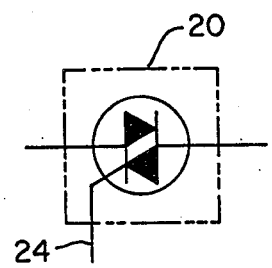
FIGS. 1a and 1b are schematic diagrams of alternate embodiments of the solid state switch in FIG. 1.
Figure 1B:
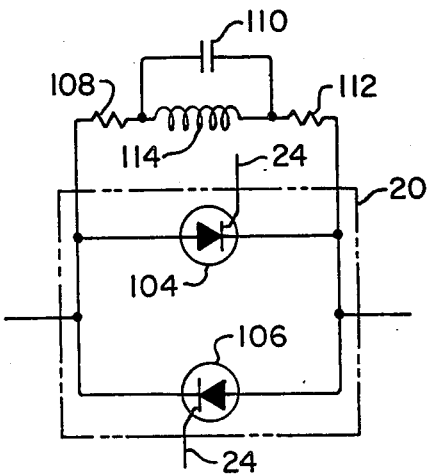

As shown in FIG. 1a, solid state switch 20 may be a triac. FIG. 1b shows an alternate embodiment wherein solid state switch 20 is comprised of silicon controlled rectifiers (SCR) 104 and 106. When solid state switch 20 is comprised of inverse SCR's 104 and 106, a circuit to detect that one of the SCR's has failed to open is included. As seen in FIG. 1b, resistor 108 is connected between the cathode of SCR 104 and the first lead of dc relay coil 114. Resistor 112 is connected between the cathode of SCR 106 and the second lead of coil 114. Capacitor 110 is connected in parallel with coil 114. The SCR failure detection circuit under normal operating conditions passes current through resistor 108, capacitor 110 and resistor 112 during one-half cycle of the applied voltage and back through the same components during the subsequent half cycle. Capacitor 110 charges in one direction, then discharges and charges in the opposite direction such that capacitor 110 acts as a short circuit during normal operation and functions to pass current around coil 114 leaving coil 114 deenergized.

Upon failure of SCR 104 or 106, a dc current passes in one direction through resistor 108, coil 114 and resistor 112. Under a failed SCR condition, capacitor 110 charges and blocks further current flow through capacitor 110 and coil 114 energizes. Coil 114 upon energizing closes an alarm circuit indicating one of the SCR's has failed.

Water is removed from well-head flow to obviate pumping water unnecessarily. Free water and gas are removed from the well-head flow before the flow stream is passed into port 42 of electrostatic oil dehydrator 40. Oil dehydrator 40 is used to remove additional water from the remaining emulsion of oil and water.

Coalescence occurs when small water droplets collide and unite to form larger water droplets. Water droplets are coalesced by establishing an electric field between grid elements 38 and passing the oil-water emulsion through the electric field. Since water is slightly polar, it will move toward the oppositely charged grid elements 38, coalesce and gravitate to the bottom of dehydrator 40 where water is removed through port 44.

Small water droplets have a low settling velocity and therefore gravitate slowly or are carried along with the throughflow. It is desirable to cause small water droplets to coalesce to form larger water droplets since the larger water droplets gravitate more readily. The size of the water droplets also affects the amount of power required to coalesce the water droplets. Small water droplets are more difficult to move through oil and therefore require more power to coalesce. Specifically, to coalesce small water droplets, an intense electric field is required as is achieved when a high voltage is applied to grid elements 38.

Water in the emulsion can cause a conductive link between grid elements 38 or between grid elements 38 and ground. A conductive link is essentially a short circuit on secondary winding 14 that causes coalescence and hence the dehydration process to terminate while throughflow and power consumption continue with the result that without some means of protection step-up transformer 10 will exceed rated power.

The power delivered to the dehydration process is a function of the product of current and voltage in a winding of the step-up transformer. With a small reactive impedance in the circuit, the limit of the power delivered to the dehydration process is determined essentially by the power rating of the transformer. The higher the current the lower the voltage must be (and vice versa) to ensure that the transformer power rating is not exceeded. Thus, when the power delivered to dehydrator 40 is limited by a current limit due to a short circuit across secondary winding 14, the voltage applied to grid elements 38 is less than the maximum possible voltage, the small water droplets are not coalesced and as a result the coalescence process is less efficient. It is desirable when the voltage applied to grid elements 38 is less than the maximum possible voltage due to a current limit condition that the current limit condition be cleared so that the current can return to less than the current limit condition thereby permitting the voltage to be increased without exceeding rated power of the transformer and in turn more effectively coalesce small water droplets.

The present invention, upon sensing a current limit condition, responds in a manner similar to the manner in which the electrostatic precipitator automatic voltage control system responded to an arc by reducing the voltage applied to the primary winding of step-up transformer 10 to zero for at least one-half cycle, allowing the throughflow to dissipate the conductive link, then reapplying voltage to primary winding 12 of step-up transformer 10 at a voltage level below the voltage level at which the short circuit occurred, then increasing the voltage in the manner described in more detail below.

Figure 2:
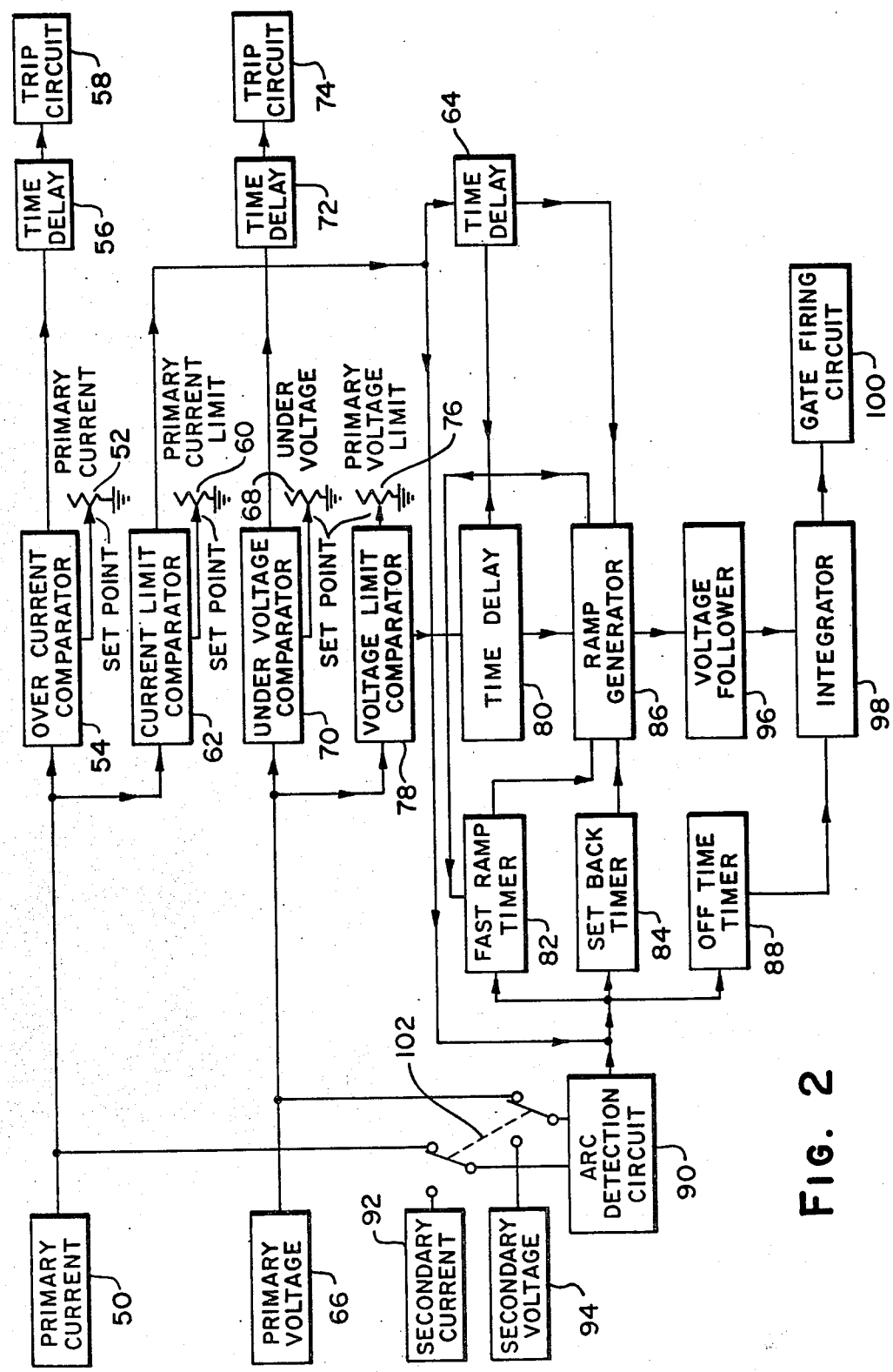
FIG. 2 is a block diagram showing the voltage control circuit in more detail.

FIG. 2 shows the voltage control and gate firing circuit 22 of FIG. 1 in block diagram form. Primary current 50 is a rectified signal representing the primary current measured by current transformer 28. Primary current 50 is compared to primary over current set point 52 in over current comparator 54. When primary current 50 exceeds primary over current set point 52, time delay 56 is energized and if an over current condition still exists time delay 56 times out, trip circuit 58 is energized indicating an over current exits in primary winding 12. Time delay 56 filters out the otherwise nuisance trips due to transient over current conditions of short duration. Trip circuit 58 energizes a coil that opens circuit breaker 17 to protect transformer 10. Trip circuit 58 is a back-up to the voltage control system for protecting transformer 10.

Primary current 50 is also compared to primary current limit set point 60 in current limit comparator 62. When primary current 50 exceeds primary current limit set point 60, current limit comparator 62 resets time delay 64. When primary current 50 exceeds primary current limit set point 60, current limit comparator 62 also resets fast ramp timer 82, set back timer 84 and off-time timer 88 resulting in the same control action as if arc detection circuit 90 had detected an arc with the exception that after off-time timer 88 has timed out and primary voltage 66 has recovered to a reduced value, primary voltage is maintained constant by disabling ramp generator 86 until time delay 64 times out. The control action that follows arc detection is described below.

Primary voltage 66 is a rectified signal representing the voltage measured across primary winding 12. Primary voltage 66 is compared to under voltage set point 68 in under voltage comparator 70. When primary voltage 66 is less than under voltage set point 68, under voltage comparator 70 energizes time delay 72. If an under voltage condition still exists then time delay 72 times out, trip circuit 74 is energized indicating an under voltage condition exists in primary winding 12. Time delay 72 filters out the otherwise nuisance trips due to transient over voltage conditions of short duration. Trip circuit 74 energizes a coil that opens circuit breaker 17 to protect transformer 10. Trip circuit 74 is a back-up to the voltage control system for protecting transformer 10.

Primary voltage 66 is also compared to primary voltage limit set point 76 in voltage limit comparator 78. When primary voltage 66 equals the primary voltage limit set point 76, voltage limit comparator 78 energizes time delay 80. Time delay 80 filters out the apparent over voltage condition due to the ripple remaining on primary voltage 66. During the time delay period the ramp generator control signal is slightly reduced and when time delay 80 times out, the firing angle of solid state switch 20 and in turn the voltage applied to primary winding 12 is maintained constant by disabling ramp generator 86 and fast ramp timer 82 until either a current limit is reached or an arc is detected.

Arc detection circuit 90 has inputs of primary current 50 and primary voltage 66 or secondary current 92 and secondary voltage 94 as determined by the position of switch 102. Although primary current 50 and primary voltage 66 are preferred, secondary current 92 and secondary voltage 94 can be used for arc detection. During arcing, step-up transformer 10 secondary voltage decreases essentially to zero; step-up transformer 10 primary voltage decreases to the impedance voltage of primary winding 12. Primary and secondary current increase to several times their normal operating values. Upon the detection of an arc, arc detection circuit 90 resets fast ramp timer 82, set back timer 84 and off-time timer 88. Thus, both arc detection and over current resets fast ramp timer 82, set back timer 84 and off-time timer 88.

For the duration of off-time timer 88 timing, gate firing circuit 100 inhibits solid state switch 20 from firing resulting in primary voltage 66 decreasing to zero. Off-time timer 88 has an adjustable time setting. The minimum setting of off-time timer 88 is the time setting of set back timer 84 but will usually be larger, up to approximately 40 milliseconds.

For the duration of set back timer 84 timing, the voltage level retained by voltage follower 96 is slowly decreased. The rate of reduction is adjustable as is the time setting of set back timer 84. The voltage level reduced is the rate of reduction times the time setting of set back timer 84. The minimum set back timer 84 time setting is one-half cycle of the applied voltage frequency plus an allowance for detection of a spark at about 50% conduction angle resulting in approximately 12 milliseconds for a 60 hertz application. Thus, when off-time timer 88 times out, the firing angle of solid state switch 20 will increase exponentially from zero to the voltage level then currently retained by voltage follower 96 and integrator 98, which is a level less than the voltage level at which the arc or over current occurred.

For the duration of fast ramp timer 82, the voltage control system controls the voltage applied to primary winding 12 as described above. Upon fast ramp timer 82 timing out, the voltage applied to primary winding 12 is increased at an adjustably rapid rate until a voltage limit, a current limit or an arc occurs. Fast ramp timer 82 timing out indicates that the power delivered to dehydrator 40 has been too low for an extended time period. Fast ramp timer 82, set at approximately 15 seconds, avoids a prolonged low power condition. Fast ramp timer 82 is reset each time a current limit or arc is detected. Fast ramp timer 82 is disabled when the voltage applied to primary winding 12 reaches primary voltage limit set point 76 and the firing angle of solid state switch 20 remains constant until a current limit or arc occurs. The power delivered to dehydrator 40 under typical operating conditions is shown as FIG. 3. The power delivered by step-up transformer 10 is shown at point a as being reduced to zero at point b due to arcing. At that time, fast ramp timer 82, set back timer 84, and off-time timer 88 are reset. During timing of off-timer 88, the power delivered to dehydrator 40 by set-up transformer 10 is maintained at zero value by off-time timer 88 maintaining solid state switch 20 in the off state. Solid state switch 20 is maintained in the off state by controlling gate firing circuit 100 such that solid state switch 20 does not turn on. After off-time timer 88 has timed out at point c, voltage is again applied to primary winding 12 of step-up transformer 10; ramp generator 86 causes gate firing circuit 100 to turn solid state switch 20 on to increase the voltage applied to step-up transformer 10 and hence the power applied to dehydrator 40. Voltage rises exponentially to point d of FIG. 3. The transformer voltage applied to dehydrator 40 at point d is less than the voltage at point a as determined by ramp generator 86. During the timing of off-time timer 88, voltage follower 96, which had been following the voltage applied to primary winding 12, is permitted to dissipate some energy so that when voltage is reapplied to primary winding 12 it is reapplied at a voltage level below the level where the arc occurred. Once the transformer power applied to dehydrator 40 has reached the level of point d, it is increased at a slow ramp rate as determined by integrator 98 until a voltage limit condition, an arc, or a current limit condition arises or until fast ramp timer 82 has timed out.

If the limiting condition is a current limit as shown at point e, the power delivered to dehydrator 40 is reduced to zero at point f simultaneously with resetting fast ramp timer 82, set back timer 84, off-time timer 88 and time delay 64. The power delivered to dehydrator 40 remains at zero for the duration of off-time timer 88 between point f and point g. During the timing of off-time timer 88, voltage follower 96, which had been following voltage applied to primary winding 12, is permitted to dissipate some energy so that when voltage is reapplied to primary winding 12 it is reapplied at a voltage level below the level where the current limit occurred. At point g, ramp generator 86 again exponentially increases the voltage applied to dehydrator 40 to a point h which is lower than the voltage delivered at point e where the current limit occurred. The voltage remains constant at the level of point h until time delay 64 time out at point i. The voltage is then increased at the slow ramp rate until a voltage limit condition, an arc or current limit condition arises, or until fast ramp timer 82 has timed out.

Point j shows that upon fast ramp timer 82 timing out, the power delivered to dehydrator 40 is increased at a fast ramp rate by voltage follower 96 and integrator 98 until either a voltage limit, current limit or arc arises. A voltage limit is shown at point k. Primary voltage remains at the voltage limit until an arc or current limit condition arises whereupon the power applied to dehydrator 40 is reduced to zero and the control cycle begins again. An arc is shown at point l causing primary voltage and hence power delivered to dehydrator 40 to be reduced to zero at point m for the duration of off-time timer 88 until point n and voltage recovery to point o.

In this manner, the automatic voltage control system maintains a high average power delivered to dehydrator 40 but is able to interrupt the power to eliminate arcing and current limit conditions that consume power and terminate the dehydration process. Simultaneously, the automatic voltage control system is able to maintain the highest possible voltage between grid elements 38 of dehydrator 40 so as to maximize coalescence of small water droplets. Furthermore, since the power delivered by step-up transformer 10 is the limiting factor and since power is the product of voltage and current when power is limited by a current limit, the voltage cannot be further increased. The voltage control circuit interrupts the power available to the dehydration process to eliminate the current limit condition causing the automatic control system to return to a low current high voltage operating condition thereby maximizing the voltage applied to grid elements 38 of dehydrator 40 and minimizing the power consumed during the dehydration process.

I claim:

1. An automatic voltage control system for limiting the power delivered to a grid of an electrostatic oil dehydrator so as not to exceed rated power of a step-up transformer by controlling the voltage applied to the primary winding of the step-up transformer, the secondary winding thereof energizes the grid of the electrostatic oil dehydrator, comprising:
   (a) the step-up transformer having a primary winding and a secondary winding with the primary winding connected to an alternating current voltage source and the secondary winding connected across the grid of the electrostatic oil dehydrator;
   (b) means for measuring the current passing through the primary winding of the step-up transformer;
   (c) means for measuring the voltage across the primary winding of the step-up transformer;
   (d) a solid state switch in series with the primary winding of the transformer;
   (e) means for comprising the current passing through the primary winding as measured by the current measuring means to a predetermined first primary current limit set point, the comparing means having a first input port for receiving the measured primary current from the primary current measuring means, a second input port for receiving the first primary current limit set point and an output port at which the compared current signal is presented; and
   (f) voltage control circuit means responsive to the compared current signal and responsive to the voltage measured by the voltage measuring means for inhibiting the solid state switch from triggering upon detecting a primary current limit has been reached, whereby when power delivered to the oil dehydrator is limited by a current limit, the magnitude of the voltage applied to the primary winding is reduced to zero to permit the current limit condition to clear and then voltage is reapplied to the primary winding until another limiting condition occurs requiring repeating the control action.

2. An automatic voltage control system as recited in claim 1 wherein the voltage control circuit means further comprises means for switching the solid state switch on to control the magnitude of the voltage applied to the primary winding of the step-up transformer.

3. An automatic voltage control system as recited in claim 1 further comprising a reactive impedance in series with the primary winding of the step-up transformer.

4. An automatic voltage control system as recited in claim 3 wherein the reactive impedance is less than a 100% reactive impedance.

5. An automatic voltage control system as recited in claim 1, 2 or 3 wherein the solid state switch is a triac.

6. An automatic voltage control system as recited in claim 1, 2 or 3 wherein the solid-state switch is comprised of inverse silicon controlled rectifiers.

7. An automatic voltage control system as recited in claim 6 further comprising means for detecting the open circuit failure of one of the silicon controlled rectifiers.

8. An automatic voltage control system as recited in claim 6 further comprising means for interrupting power to the primary winding of the step-up transformer upon detection of the open circuit failure of one of the inverse silicon controlled rectifiers.

9. An automatic voltage control system as recited in claim 1 or 2 wherein the voltage control circuit further comprises:
   (a) means for comparing the current passing through the primary winding as measured by the current measuring means to a second predetermined primary current set point, the second primary current set point having a magnitude greater than the first primary current set point, the comparing means having a first input port for receiving the measured primary current, a second input port for receiving the second primary current set point and an output port at which the compared current signal is presented; and
   (b) means responsive to the compared current signal for interrupting the power to the primary winding of the step-up transformer upon detecting primary current exceeds the second primary current set point.

10. An automatic voltage control system as recited in claim 1 or 2 wherein the voltage control circuit further comprises:
   (a) means for comparing the voltage across the primary winding of the step-up transformer as measured by the voltage measuring means to a predetermined under voltage set point, the comparing means having a first input port for receiving the measured primary voltage, a second input port for receiving the under voltage set point, and an output port at which the compared voltage signal is presented; and
   (b) means responsive to the compared voltage signal for interrupting the power to the primary winding of the step-up transformer upon detecting primary voltage below the under voltage set point.

11. A method of applying the power to a grid of an electrostatic oil dehydrator to limit the power delivered to the grid so as not to exceed rated power of a step-up transformer by controlling the voltage applied to the primary winding of the step-up transformer, the secondary winding thereof energizes the grid of the electrostatic oil dehydrator, comprising:
   (a) applying a magnitude controlled alternating current voltage to the primary winding of a step-up transformer;
   (b) continuously measuring the current passing through the primary winding of the step-up transformer;
   (c) continuously measuring the voltage across the primary winding of the step-up transformer;
   (d) continuously comparing the current passing through the primary winding to a first predetermined primary current limit set point;
   (e) switching the magnitude controlled alternating current voltage on to control the magnitude of the applied voltage in response to the measured current passing through the primary winding and the measured voltage across the primary winding when the current passing through the primary winding does not exceed the primary current limit set point;
   (f) inhibiting the magnitude controlled alternating current voltage from switching on in response to the measured current passing through the primary winding and the measured voltage across the primary winding such that the voltage applied to the primary winding is reduced to zero following the current passing through the primary winding exceeding the primary current limit set point;
   (g) maintaining the magnitude controlled alternating current voltage applied to the primary winding at zero for at least one-half cycle of the applied voltage frequency;
   (h) reapplying voltage to the primary winding at a voltage level below the level where the measured current passing through the primary winding exceeded the primary current set point;
   (i) continuously comparing the voltage across the primary winding to a predetermined primary voltage limit set point;
   (j) increasing the voltage applied to the primary winding at a predetermined rate; and
   (k) repeating steps (e) through (j) as required.

12. A method of applying power to a grid of an electrostatic oil dehydrator as recited in claim 11 wherein the step of increasing the voltage applied to the primary winding at a predetermined rate comprises increasing the voltage applied to the primary winding at a predetermined rate until the first primary current limit set point is again exceeded.

13. A method of applying power to a grid of an electrostatic oil dehydrator as recited in claim 11 wherein the step of increasing the voltage applied to the primary winding at a predetermined rate comprises:
   (a) increasing the voltage applied to the primary winding at a predetermined rate until a voltage limit is reached; and
   (b) maintaining the voltage applied to the primary winding at the voltage limit upon primary voltage reaching the primary voltage limit set point.

* * * * *

UNITED STATES PATENT AND TRADEMARK OFFICE
CERTIFICATE OF CORRECTION

PATENT NO. : 4,479,164

DATED : October 23, 1984

INVENTOR(S) : Leon S. Siegel

It is certified that error appears in the above—identified patent and that said Letters Patent is hereby corrected as shown below:

Column 8, line 22, delete "comprising" and substitute --comparing-- therefor.

Signed and Sealed this

Second Day of April 1985

[SEAL]

*Attest:*

DONALD J. QUIGG

*Attesting Officer*     *Acting Commissioner of Patents and Trademarks*